United States Patent [19]

Yano et al.

[11] 4,308,658

[45] Jan. 5, 1982

[54] ELECTROCHROMIC DISPLAY DEVICE MANUFACTURE METHOD

[75] Inventors: Kohzo Yano; Sadatoshi Takechi; Yasuhiko Inami, all of Tenri; Hisashi Uede, Yamatokoriyama, all of Japan

[73] Assignee: Sharp Kabushiki Kaisha, Osaka, Japan

[21] Appl. No.: 116,244

[22] Filed: Jan. 28, 1980

Related U.S. Application Data

[63] Continuation of Ser. No. 926,087, Jul. 19, 1978, abandoned.

[51] Int. Cl.$^3$ ............................ H01G 9/00; G02F 1/01
[52] U.S. Cl. ................................... 29/570; 427/126.3; 427/166; 427/248.1; 427/255.3; 350/357; 427/108; 427/109
[58] Field of Search ..................... 350/357; 29/570; 427/126.3, 166, 248.1, 255.3, 108, 109

[56] References Cited

U.S. PATENT DOCUMENTS 3,843,232  10/1974  Berets .................................. 350/357
3,970,365  7/1976  Giglia .................................. 350/357

*Primary Examiner*—Norman Morgenstern
*Assistant Examiner*—Richard Bueker
*Attorney, Agent, or Firm*—Birch, Stewart, Kolasch and Birch

[57] ABSTRACT

In an electrochromic display device including an electro-chromic layer comprising a film made of amorphous tungsten oxide ($WO_3$), the device is fabricated under the ambience of both a relative humidity below 60% and an absolute humidity below $1.17 \times 10^{-2}$ Kg/Kg to assure electro-optical properties of the electrochromic display device.

2 Claims, 9 Drawing Figures

ELECTROCHROMIC DISPLAY DEVICE MANUFACTURE METHOD

This application is a continuation of copending application Ser. No. 926,087, filed on July 19, 1978, now abandoned.

BACKGROUND OF THE INVENTION

1. Field of the Invention

The present invention relates to an electro-optical display containing an electrochromic material which manifests reversible variations in the light absorption properties upon application of properly controlled voltage or current. This display is referred to as an "electrochromic display (ECD)" hereinafter.

The present invention relates, more particularly, to a manufacturing method for an electrochromic display cell which employs a thin film of amorphous tungsten ($WO_3$) as an electrochromic material, and a liquid electrolyte as ion sources.

2. Description of Prior Art

Electrochromic materials which manifest reversible variations in the light absorption properties upon application of properly controlled electric energy are well known in the art. Examples were disclosed in Talmey, U.S. Pat. No. 2,319,765 and Deb et al, U.S. Pat. No. 3,521,941.

Such electrochromic materials can be shaped in a desired pattern to display desired characters, symbols and patterns by reversibly selecting the ligh absorption properties through the use of the electric control. Examples were disclosed in U.S. Pat. No. 1,068,744 and the above-mentioned Deb et al, U.S. Pat. No. 3,521,941.

There are three types of ECD cells using transition metal oxides. The first one is the liquid type which includes a liquid electrolyte mixed with coloration materials (Jones et al, U.S. Pat. No. 3,283,656). The second type includes an inorganic insulation film as the ion permeable insulator see (the above-mentioned Deb et al, U.S. Pat. No. 3,521,941). The last type includes solid state electrolytic materials see (Castellion et al, U.S. Pat. No. 3,721,710). The electrochemical display cell of the present invention relates to the type which employs the liquid electrolyte as ion sources.

Various basic structures of an electrochromic display cell of the liquid electrolyte type have been proposed. Electrochromic materials are well known in the art, as already discussed above, and disclosed in, for example, the above-mentioned Talmey, U.S. Pat. No. 2,319,765 and the Deb et al, U.S. Pat. No. 3,521,941. Preferable materials are a thin film of amorphous tungsten ($WO_3$), and a film of amorphous molybdenum oxide ($MoO_3$) as disclosed in M. D. Meyers et al, U.S. Pat. No. 3,708,220.

Display electrodes of the seven-segmented type for displaying numeral information were disclosed in R. D. Giglia et al, U.S. Pat. No. 3,827,784, wherein the $WO_3$ film is formed on the display electrode comprising a $SnO_2$ film doped wth $As_2O_5$. A technique for protecting the edge portion of the electrochromic layer formed on the display electrode through the use of an insulating layer was disclosed in Eric Saurer, U.S. Pat. No. 3,836,229. A technique for covering the lead electrode portions with an insulation film was proposed in J. Bruinink, Pro. Sym. Sept. 29-30, 1975 at Brown Boveri Res.

A counter electrode comprising a graphite plate or a stainless steel plate coated with an electrochromic material was disclosed in R. D. Giglia et al, U.S. Pat. No. 3,819,252, and Witzke et al, U.S. Pat. No. 3,840,287.

The background of the display is formed by adding a pigment to the liquid electrolyte (the above-mentioned R. D. Giglia et al, U.S. Pat. No. 3,819,252), or by disposing an opaque plate, through which ions can travel, behind the display electrode (R. D. Giglia, U.S. Pat. No. 3,892,472).

Examples of the liquid electrolyte were disclosed in L. C. Beegle, U.S. Pat. No. 3,704,057.

(i) sulfuric acid aqueous solutions ranging in concentration from a 0.1 to a 12.0 molar solution; (ii) sulfuric acid solutions of propylene carbonate, acetonitrile, dimethylformamide and other organic solvents;

(iii) strong organic acid such as 2-toluene sulfuric acid in propylene carbonate and other organic solvents;

(iv) alkali metals, alkaline-earth metals or rare-earth metals, such as lithium perchlorate, lithium nitrate, lithium chlorate and lithium sulfate in an organic solvent such as acetonitrile and propylene carbonate.

A semi-solid conductive electrolyte was disclosed in the above-mentioned M. D. Meyers et al, U.S. Pat. No. 3,708,220. The electrolyte comprises sulfuric acid and gelling agents such as polyvinyl alcohol, polyacryl amide, ethylene glycol, sodium silicate and carbo-sil. Especially, the polyvinyl alcohol/sulfuric acid shows a preferable characteristic. U.S. Pat. No. 3,708,220 also says that the viscosity and the vapor pressure of the above-mentioned gel can be properly controlled by adding dimethylformamide, acetonitrile, propionitrile, butyrolactone or glycerine.

Another example of the semi-solid conductive electrolyte was proposed in U.S. Patent Application Ser. No. 41,153 (1970) filed by D. J. Berets et al. The electrolyte comprises a mixture of greasy lithium stearate, 2-toluene sulfuric acid and propylene carbonate.

The above-mentioned electrolytes have various problems. The largest problem is that the $WO_3$ film is soluble in the electrolyte and thus the $WO_3$ film becomes deteriorated by the electrolyte, for example, the transparency of the $WO_3$ film is decreased.

When the electrolyte comprises the sulfuric acid or the organic acid, the $WO_3$ film dissolves in the electrolyte when the cell is maintained at 80° C. for seventy-two hours. Moreover, the hydrogen over potential of the proton in the aqueous solutions or the organic solutions in about 1.5 V. Therefore, the system must be driven by a voltage below 1.5 V. Accordingly, the acid electrolyte is not suited for ensuring the accurate operation of the electrochromic display device.

When the electrolyte comprises alkaline metals, alkali-earth metals or rare-earth metals in the organic solvent, the above-mentioned problems are fairly improved. However, the possibility of forming a solution of the $WO_3$ film still remains.

In the above-mentioned U.S. Pat. No. 2,704,057, the electrolyte comprising lithium perchlorate ($LiClO_4$) in acetonitrile was disclosed. However, this electrolyte is not suited for the practical use, since the acetonitrile boils at 79° C. The electrolyte comprising $LiClO_4$ in propylene carbonate has a wide range of the tolerant temperature, more specifically, −49.2° C. through 241.7° C. However, this electrolyte is not stable at high temperatures. More particularly, the pyrolysis occurs in the electrolyte when the cell is maintained at 80° C., and the solution changes from colorless is destroyed. Other electrolytes including propylene carbonate described in U.S. Pat. No. 3,704,057 do not show sufficient conductivity.

In case where the electrolyte is gelled by PVA as shown in the above-mentioned U.S. Pat. No. 3,708,220, the cell is still unstable at a high temperature, for example, 80° C. That is, the gelling of the electrolyte is not effective for the antisoluvation of the $WO_3$ film.

The electrolyte comprising the greasy stearate does not show high conductivity. Therefore, the responsiveness of the system is not satisfactory.

An improvement for the problems of the soluvation of the $WO_3$ film was disclosed in R. D. Giglia, U.S. Pat. No. 3,819,252, wherein the electrolyte is saturated by $WO_3$. However, this is not practical, since it is not possible that only the $WO_3$ in the electrolyte preceipitates and dissolves in the electrolyte even when the temperature varies.

A further advance for eliminating the above-mentioned defaults of the soluvation of in $WO_3$ film was disclosed the copending U.S. Patent Application Ser. No. 877,884, filed Feb. 15, 1978 assigned to the same assignee, and entitled "ELECTROCHROMIC DISPLAY CELL". Of particular interest in the context of the present invention is the above U.S. Patent Application Ser. No. 877,884, whose disclosure is incorporated herein by reference. The corresponding West German Patent Application was filed on Feb. 16, 1978 under P 28 06 670.8.

The following is the gist of the U.S. Patent Application Ser. No. 877,884. An electrochromic display cell comprising a display electrode coated with a $WO_3$ film, and an electrolyte filled in the electrochromic display cell as an ion source. The electrolyte comprises Y-Butyrolactone mixed with $LiClO_4$, $NaClO_4$ or $LiBF_4$. The $WO_3$ film is formed on the display electrode under the condition where the substrate is heated up to 250° C. through 400° C.

However, mass production of the ECD is rather difficult even by the last-mentioned U.S. Patent Application Ser. No. 877,884 because of the inevitable occurrence of variations in the response characteristics in the ECD.

SUMMARY OF THE PRESENT INVENTION

In view of the foregoing, it is a primary object of the present invention to provide an electrochromic display cell which ensures stable operations.

More particularly, it is another object of the present invention to provide an electrochromic layer so that an electrochromic display cell can be obtained in satisfactory yields.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electrochromic film of an electrochromic display cell is deposited in an environment with a relative humidity below 60% and an absolute humidity below $1.17 \times 10^{-2}$ kg/kg, simultaneously.

BRIEF DESCRIPTION OF THE DRAWINGS

The present invention will become more fully understood from the detailed description shown hereinbelow and the accompanying drawings which are given by way of illustration only, and thus are not limitative of the present invention and wherein.

DESCRIPTION OF THE PREFERRED EMBODIMENTS

Figure 1:
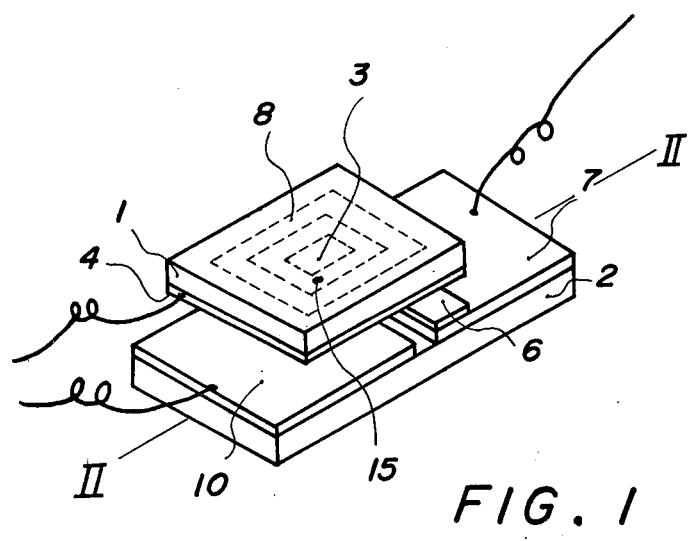
FIG. 1 is an exploded perspective view of a basic structure of an electrochromic display cell.
Figure 2:
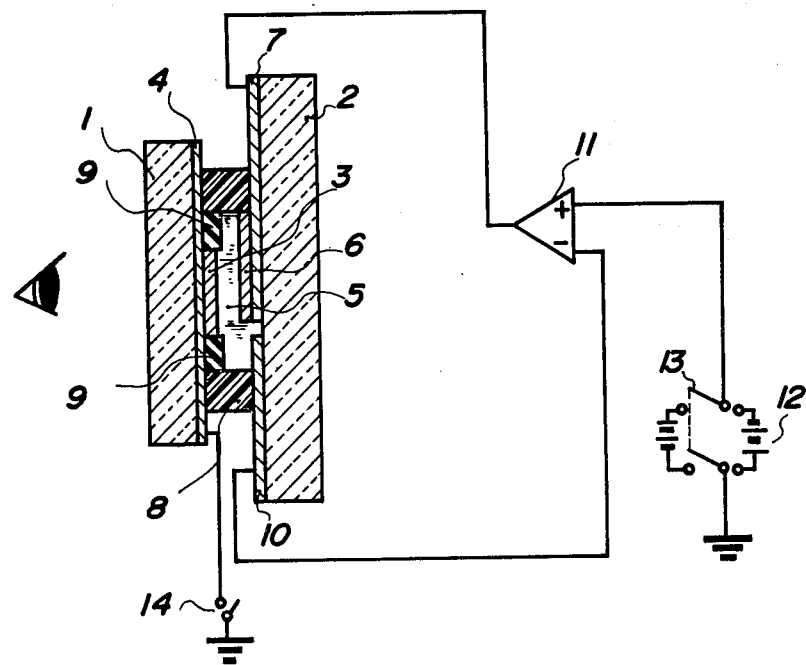
FIG. 2 is a sectional view of the electrochromic display cell as seen at II—II of FIG. 1.

FIGS. 1 and 2 show an electrochromic display cell of the liquid electrolyte type adapted to the present invention.

Two glass substrates 1 and 2 define the electrochromic display cell. An electrochromic layer 3, more specifically a amorphous tungsten ($WO_3$) film, is formed on a front glass substrate 1. The $WO_3$ film 3 can be deposited by evaporation techniques or sputtering techniques as is well known. The $WO_3$ film 3 is formed on a transparent display electrode 4, of which an extended portion functions as a lead electrode. The transparent electrode 4 is made of $In_2O_3$ doped with $SnO_2$ and formed through the use of electron beam evaporation techniques to have a resistance of $20\Omega$/sq. A liquid electrolyte 5 is filled in the cell. The liquid electroyte 5 is mixed with pigment for creating the display background. A suitable pigment is, for example, $Al_2O_3$ powder of 10 vol% through 20 vol% such as "CR-0.3 $\mu$m" manufactured by Mellar Co. Ltd.

A counter electrode comprises an electrode 7 formed on a rear glass substrate 2 and an electrochromic layer 6 formed thereon. The electrode 7 is made of $In_2O_3$, and an extended portion thereof functions as a lead electrode. The electrochromic layer 6 is made of a same material as the electrochromic layer 3. The cell is sealed by a spacer 8 comprising a glass plate of 1 mm thickness and epoxy resin such as "R-2401-HC-160" manufactured by Somal Kogyo KK. An insulation layer 9 is formed on the lead electrode to protect the lead electrode from the electrolyte 5. The insulation layer 9 comprises a $SiO_2$ film formed through the use of vacuum evaporation techniques. A reference electrode 10 made of an $In_2O_3$ film is formed on the rear glass substrate 2.

The above-mentioned electrochromic display cell is driven by a driver circuit comprising a battery 12, switches 13 and 14, and a high input impedance linear amplifier 11. An opening 15 for injecting the electrolyte 5 is sealed by a sealing glass plate.

The electrochromic display cell is maintained within a thermo-hygrostat (manufactured by Tabai Co.) for controlling the ambient conditions thereof.

The front glass substrate 1, the electrode 4, the electrochromic layer 3 and the insulation layer 9 are transparent and, therefore, the operator observes the uniform white background when the display is in the OFF state. When the electric field is applied to the electrochromic display cell by closing the switch 14 and inclining the selection switch 13 to the positive side, the display electrode or the $WO_3$ film 3 is placed into the coloration state of blue. Conversely, when the selection switch 13 is inclined to the negative side and the switch 14 is closed, the display electrode is retured to the colorless state or the bleached state.

The electrochromic display cell of FIG. 2 is driven by the constant potential method, which is suited for the electrochromic display cell including the electrochromic layer and the liquid electrolyte.

The reason why the constant potential method is adapted is that in the electrochromic display cell of the liquid electrolyte type, a response time for the coloration and the bleach depends principally on potential differences between the electrolyte and the display electrode because the coloration operation and the bleach operation are effected in accordance with the potential difference. The constant potential method can constantly hold the potential differences therebetween at a desirable value.

The effect of the present invention can be obtained by controlling the manufacturing ambience conditions of the electrochromic layers 3 and 6 as described below. The fabrication conditions of the electrochromic display cell and electro-optical properties of the same are summarized in the following Table I.

TABLE I

1. Vacuum evaporation conditions of the $WO_3$ layers 3 and 6.
   (i) resistance heating method using a tungsten boat
   (ii) degree of vacuum: $5 \times 10^{-4}$ torr ($O_2$ leak)
        Leak by $O_2$ gas is effective from $5 \times 10^{-5}$ torr to $5 \times 10^{-4}$ torr.
   (iii) temperature of the substrate: 350° C.
   (iv) thickness of the $WO_3$ layer: 5000Å
   (v) rate of the vacuum evaporation: 8-10Å/sec
2. The electrolyte 5.
   1.0 molar lithium perchlorate ($LiClO_4$) in γ-Butyrolactone
3. Measure of electro-optical responses of the electrochromic display cell.
   (i) applied voltage: writing-in; +1.0V (reference electrode of the transparent electrode 4 and the constant potential method)
        bleaching; −1.5V (the same)
   (ii) electro-optical response; an optical system is utilized which has a frequency characteristic of a peak of 590 nm. Such optical system is achieved by a photo multiplier TOSHIBA S. 4, a sharp-cut filter 0-58, and a tungsten lamp Olympus 6V-8A. The output from the photo multiplier is detected by a memory synchroscope. The writing-in time is defined as a response time when

TABLE I-continued constant ratio becomes 10% of the writing-in coloration.
the writing-in; the contrast ratio 3:1
the bleaching; the contrast ratio 1.3:1

Figure 3:
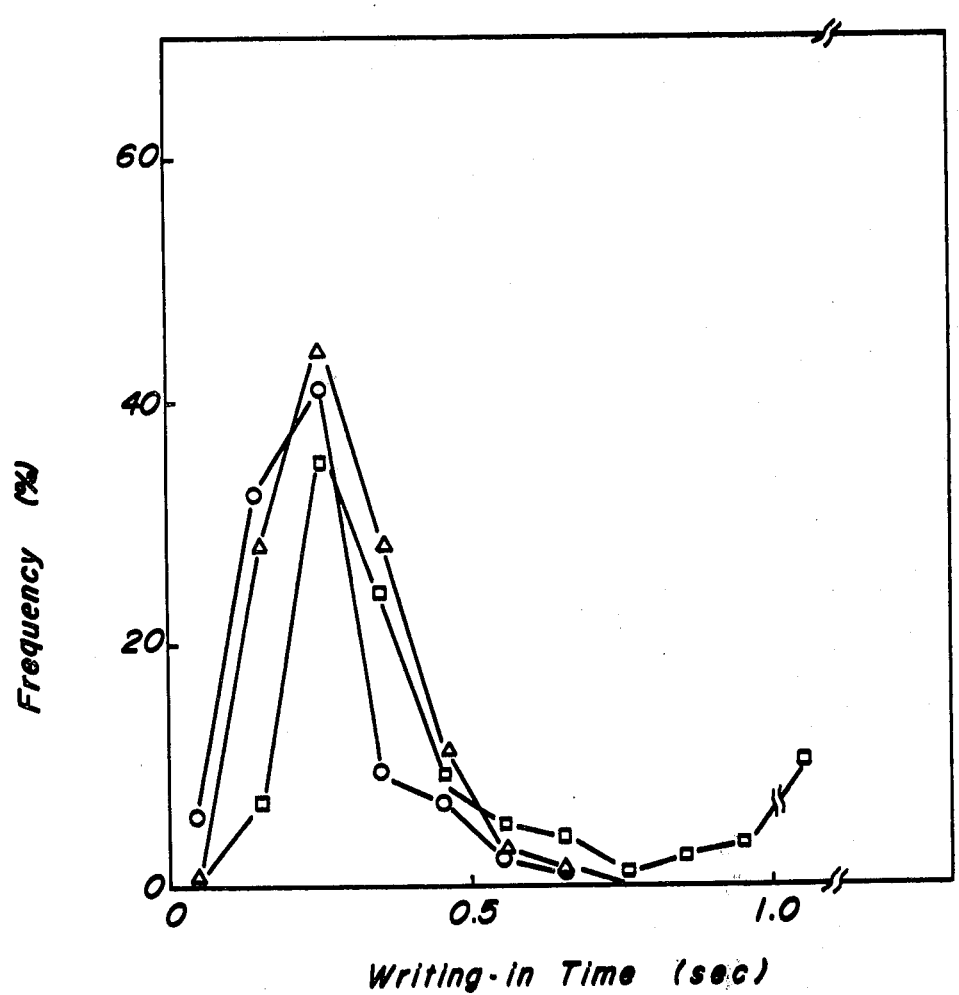
FIG. 3 is a graphical representation showing writing-in characteristics of an electrochromic display cell according to the ambient humidity while the electrochromic display cell is being fabricated.
Figure 4:
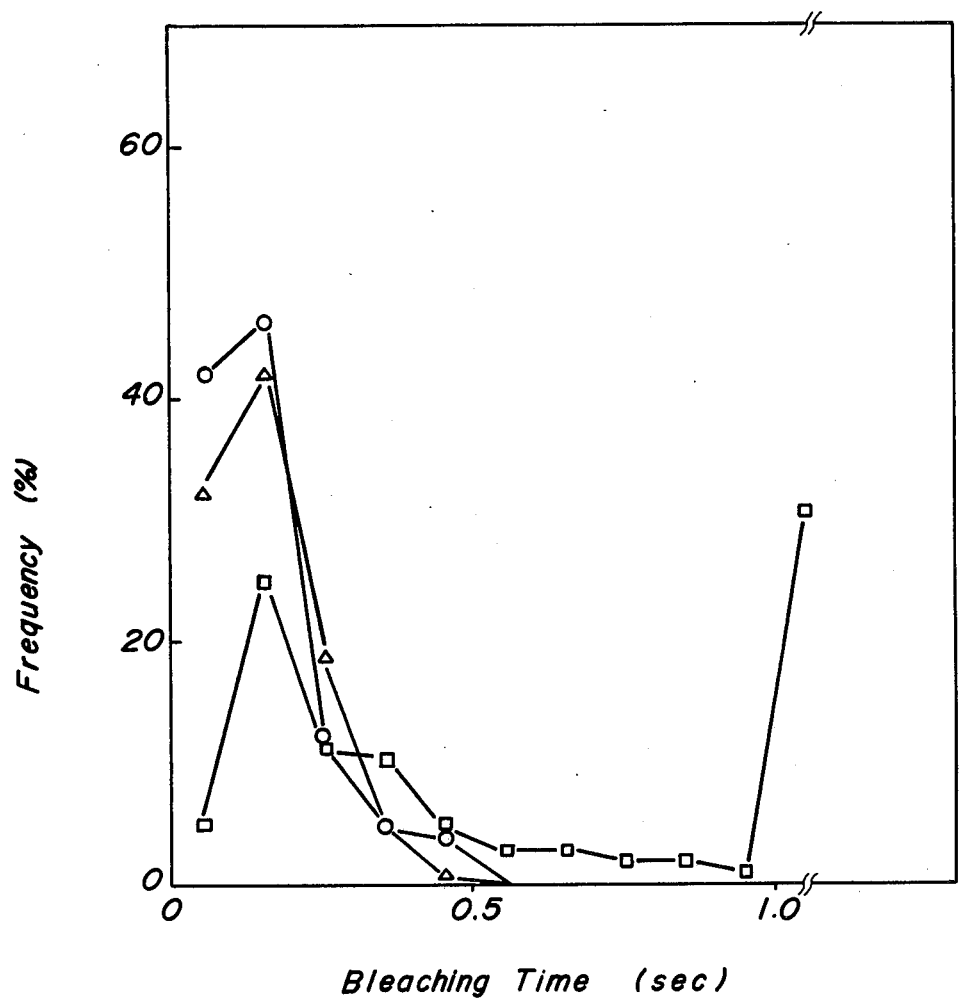
FIG. 4 is a graphical representation showing the bleaching characteristics of an electrochromic display cell in a manner similar to that of FIG. 3.

FIGS. 3 and 4 shows graphical representations of the writing-in characteristics and the bleaching characteristics of the electrochromic display cell according to different humidities of three kinds, 45 to 50%, 55 to 60%, and 65 to 70% with respect to a constant temperature of 20° C.

In FIGS. 3 and 4, the data with respect to a humidity of 45 to 50% are plotted by means of the line O—O, the data with respect to a humidity of 55 to 60% are plotted in accordance with the line △—△, and the data concerning a humidity of 65 to 70% are plotted according to the line □—□. Measurements of the electro-optical properties of the electrochromic display cell are conducted in accordance with the conditions shown in Table I. Intervals between two measurement points along the abscissas of FIGS. 3 and 4 are 100 msec. The all data above 1 sec are represented by a datum at 1.050 msec. The orditates of FIGS. 3 and 4 are frequency by a unit of %.

It will be apparently observed from FIGS. 3 and 4 that the electro-optical properties of the electrochromic display cell depend greatly on the ambience, especially, regarding the bleaching operation as shown in FIG. 4. In the data of the high humidity of 65 to 70%, for example, the bleaching time over 1 sec is exhibited regarding the electrochromic display cells of 31%. Some electrochromic display cells show the bleaching time of ten and several seconds.

Assume now that a good electrochromic display cell is limited to those of which both the writing-in time and the bleaching time are below 400 msec, since the yield of the good electrochromic display cell is 66% concerning the writing-in operation and the yield of the same is 54% concerning the bleaching operation, the total yield of the same is merely approximately 36%.

In contrast, it will be apparently noted that the data plotted in accordance with the humidity of 45 to 50% exhibit a normal distribution curve so that no surrounding conditions, especially, the humidity, affect the electrochromic display cell. In this case, the good electrochromic display cell is also limited to the same as that of the humidity of 65 to 70%. As arithmetical mean value of the writing-in time is 250 msec and standard deviation of the same is 120 msec, the yield of the electrochromic display cell is 88%. There is no electrochromic display cell whose bleaching time is above 1 sec as shown in the humidity of 65 to 70%. Since the arithmetic mean value of the bleaching time is 170 msec and the standard deviation of the same is 170 msec, the yield of the electrochromic display cell is 94%. Therefore, the total yield of the electrochromic display cell is approximately 82%. It will be apparent from the above results that the control of the ambient conditions greatly affects the electro-optical properties of the electrochromic display cell.

Figure 5:
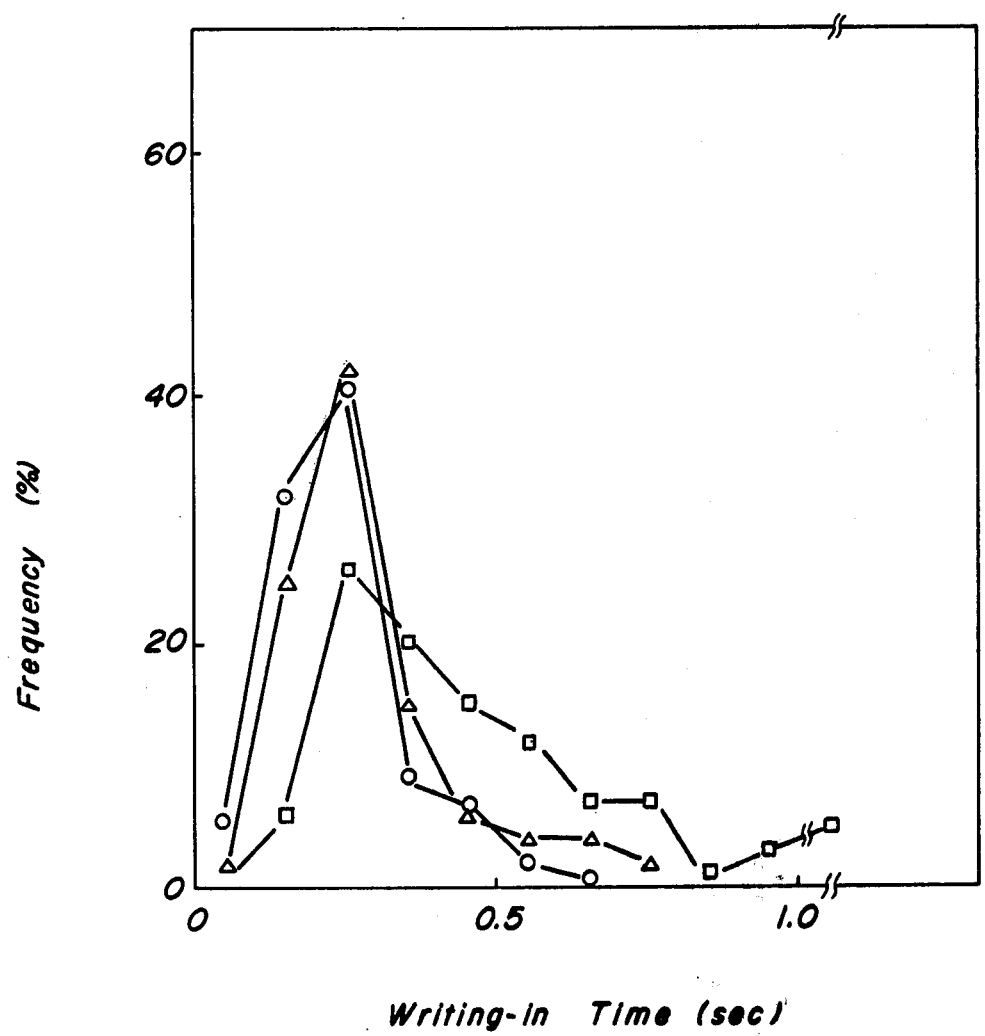
FIG. 5 is a graphical representation illustrating writing-in characteristics of an electrochromic display cell according to the ambient temperature while the electrochromic display cell is being fabricated.
Figure 6:
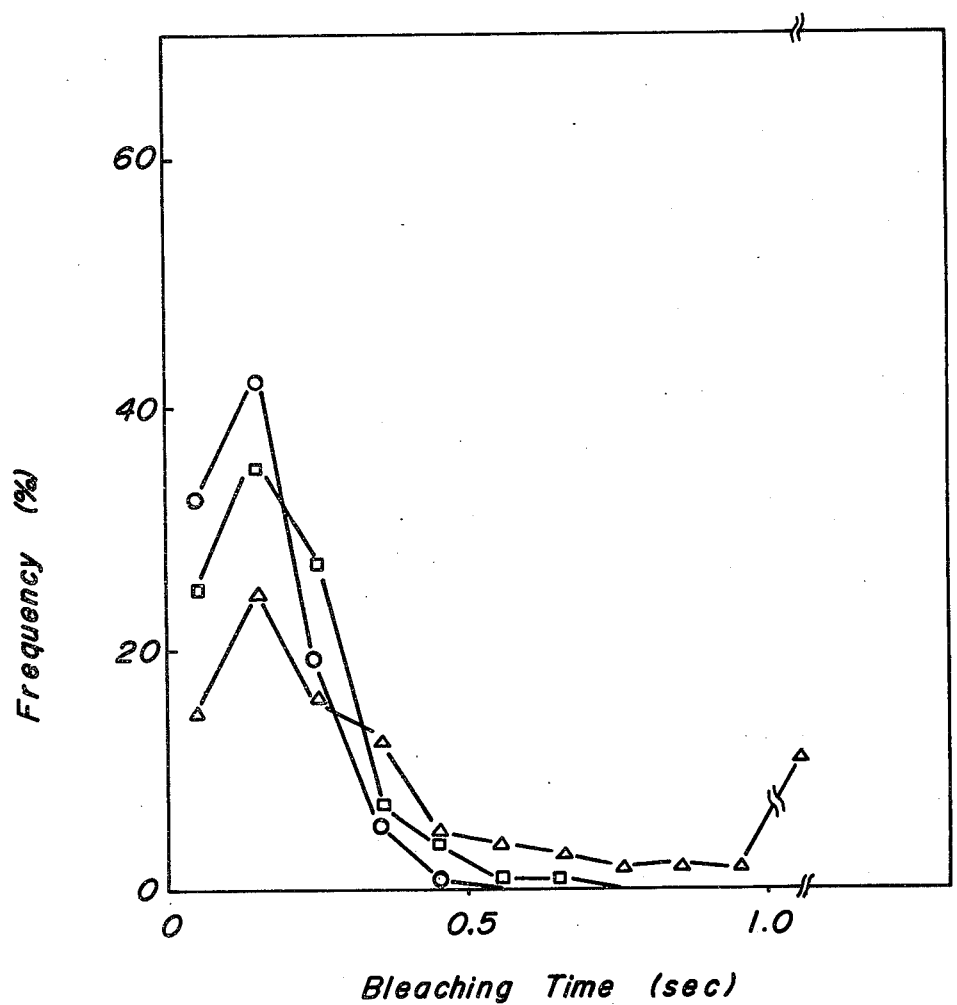
FIG. 6 is a graphical representation illustrating bleaching characteristics of an electrochromic display cell in a manner similar to that of FIG. 5.

FIGS. 5 and 6 show graphical representations of the writing-in characteristics and the bleaching characteristics of the electrochromic display cell with respect to varying temperature, under the conditions of constant relative humidity of 55 to 60%, respectively. In these drawings, the data in conjunction with a temperature of 20° C. are plotted by means of the line ○—○, the data of a temperature of 25° C. are plotted in accordance with the line △—△, and the data of a temperature of 30° C. are plotted according to the line □—□. Measuring conditions of the electrochromic display cell is described in accordance with Table I.

As shown from FIGS. 5 and 6, in the temperature of 20° C., the yields of the electrochromic display cell are 90% regarding the bleaching operation, respectively, in accordance with the above criteria. Therefore, the total yield of the electrochromic display cell is above 89%.

In the temperature of 25° C., on the other hand, the total yield of the electrochromic display cell is approximately 79% because the yields of the same are 89% concerning the writing-in operation and 94% regarding the bleaching operation, respectively, in accordance with the above criteria.

In the temperature of 30° C., however, the total yields of the electrochromic display cell is merely approximately 35% since the yields of the same are 50% with respect to the writing-in operation and 71% regarding the bleaching operation, respectively, in accordance with the same criteria.

It will be clearly observed from the results shown in FIGS. 5 and 6 that only the control of the relative humidity during the fabrication of the electrochromic display cell is significant for obtaining a good electrochromic display cell. This involves another parameter of vapor pressure of water in the atmosphere, namely, absolute humidity.

Figure 7A:
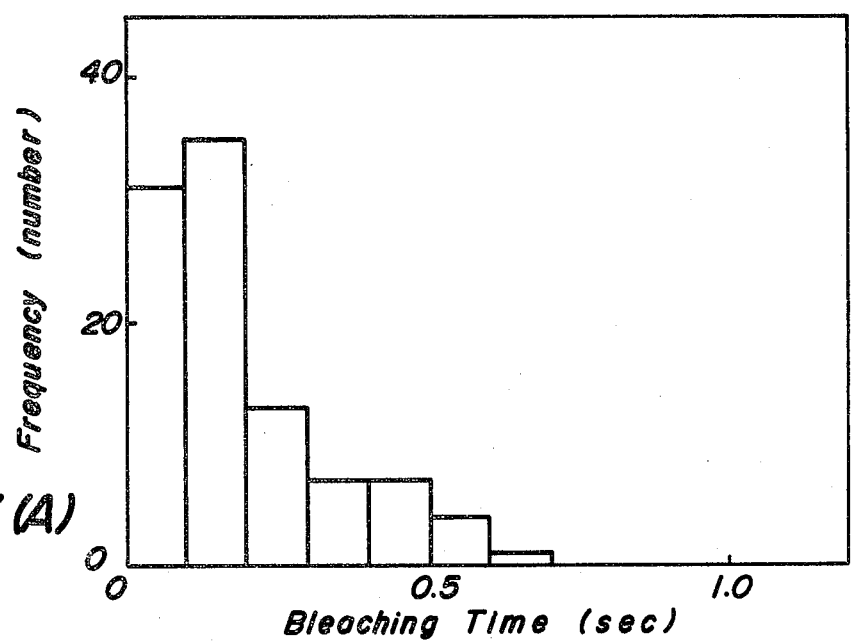
FIGS. 7(A) and 7(B) are graphical representations showing bleaching characteristics and writing-in characteristics of an electrochromic display cell which is being fabricated under a high temperature and, simultaneously, a low humidity, respectively.
Figure 7B:
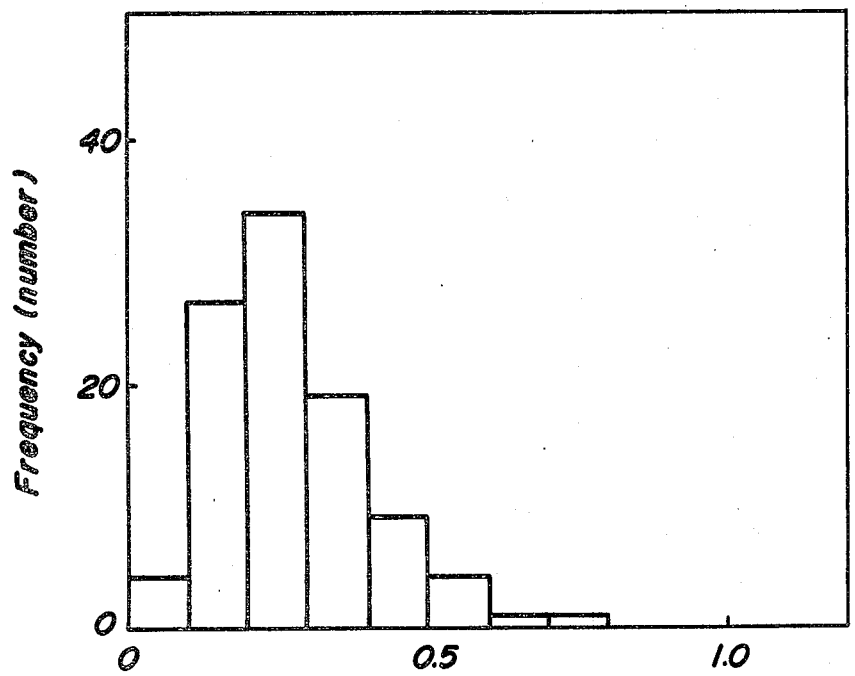

FIGS. 7(A) and 7(B) illustrate graphs of the writing-in operation and the bleaching operation of the electrochromic display cell under the conditions that the absolute humidity is $1.17 \times ^{-2}$ kg/kg (the relative humidity of 60% at 25° C.) and then the temperature is fixed at 30° C., that is, the relative humidity is 45% at 30° C. The above absolute humidity of $1.17 \times 10^{-2}$ kg/kg is the greatest value among the preferable absolute humidity throughout the ambience of FIGS. 3 to 6.

The data in FIGS. 7(A) and 7(B) are plotted with frequency by the number as ordinate and the writing-in time by the second or the bleaching time by the second as abscissa, respectively. The measurement conditions are that the temperature is 30° C., the relative humidity 40 to 45%, the contrast ratio is 3:1 under the optical system having the peak of 590 nm, the writing-in voltage is +1.0 V as compared with the reference electrode such as the transparent electrode 4, and the bleaching voltage is −1.5 V in comparison with the reference electrode.

It will be apparently noted that the good electrochromic display is obtained in an approximately 74% yield in accordance with the previously described criteria since yields of the electrochromic display cell are 85% concerning the writing-in operation and 87% in the bleaching operation according to the same criteria, respectively. This is the preferable ambience for fabricating the good electrochromic display cell.

As previously described, the excellent electrochromic display cell is obtained with a yield of 75% by setting the ambient of the electrochromic layers 3 and 6 to both the relative humidity below 60% and the absolute humidity below $1.17 \times 10^{-2}$ kg/kg. The excellent electrochromic display cell means that it has the writing-in time and the bleaching time both below 400 msec under the operation conditions described in Table I.

Figure 8:
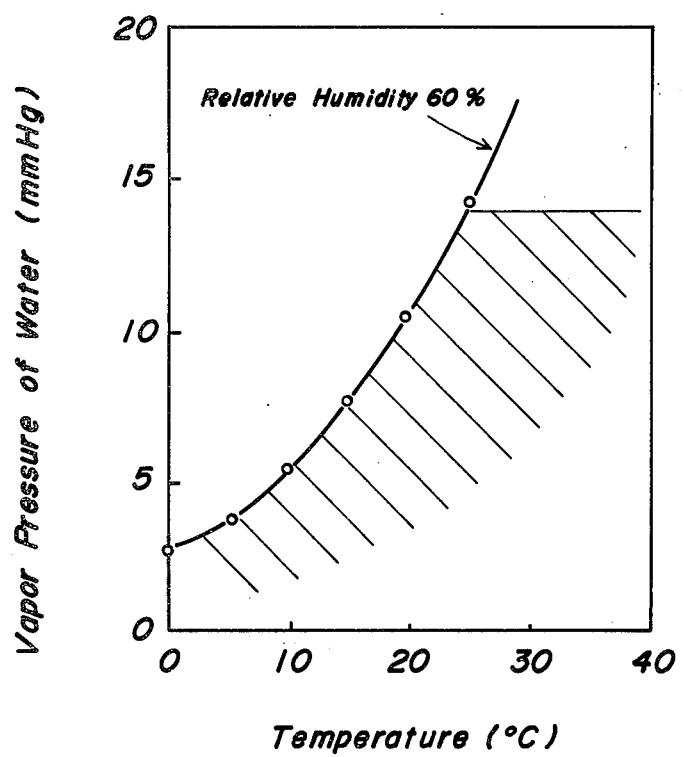
FIG. 8 is a graphical representation illustrating a relation between temperature and vapor pressure of water.

Shaded parts of FIG. 8 indicate the preferable conditions for fabricating the electrochromic display cell, namely, the above-mentioned ambience. The data regarding the relative humidity of 60% are plotted with the temperature in °C. as the abscissa and the vapor pressure of water by mmHg as ordinate.

We can not definitely find out the causes to effect the inferiority of the response characteristics of the electrochromic display cell by the ambient conditions applied thereto, especially, the humidity. It is true, nevertheless, we think the following may probably be the causes.

In accordance with J. Electrochem. Soc. 124 (5), 749, (1977) by O. F. Schirmer et al, it was reported that the electro-optical properties of the $WO_3$ film are related to the crystallization thereof and as the crystallization of the $WO_3$ film is increased, the response time of the electro-optical properties thereof becomes slower. We have observed cracks in the order of several microns on the $WO_3$ film through a scanning type electron microscope, the $WO_3$ film being deposited under high temperature and humidity.

From the above results, it can be tentatively supposed that the humidity contained within the atmosphere accelerates the crystallization of the $WO_3$ film and, subsequently, the cracks occurr within the $WO_3$ film, and the electric field applied to the $WO_3$ film correspondingly reduced, whereby the electro-optical properties of $WO_3$ film are intended to be damaged. However, this hypothesis depends on simple estimates and further experiments are required to determine the mechanism of this hypothesis.

While only certain embodiments of the present invention have been described, it will be apparent to those skilled in the art that various various changes and modifications may be made therein without departing from the spirit and scope of the invention as claimed.

What is claimed is:

1. A method for fabricating an electrochromic display device including two parallel substrates defining a cavity therebetween, electrodes formed on the respective substrates, layers of electrochromic material disposed between the substrates, and an electrolyte disposed in the cavity defined by the substrates, said method comprising the steps of:

controlling the humidity of an environment to hold it below a relative humidity of 60% and, simultaneously, an absolute humidity of $1.17 \times 10^{-2}$ kg/kg at those times when the humidity of the ambient environment would otherwise exceed said relative humidity of 60% or absolute humidity of $1.17 \times 10^{-2}$ kg/kg; and depositing the layers of the electrochromic material onto the surface of the electrodes in a vacuum chamber positioned in said controlled environment and fabricating the electrochromic display device in said environment from said substrates, electrodes, electrochromic layers and electrolyte.

2. The method according to claim 1, wherein said layers of electrochromic material comprise amorphous tungsten oxide ($WO_3$).

* * * * *